United States Patent [19]

Ladisch

[11] Patent Number: 4,836,236
[45] Date of Patent: Jun. 6, 1989

[54] FLUSH SEALING TANK VALVE WITH DIAPHGRAM

[76] Inventor: Thomas P. Ladisch, Box 558, R.D. 1, Alburtis, Pa. 18011

[21] Appl. No.: 79,656

[22] Filed: Jul. 29, 1987

[51] Int. Cl.[4] ............................................. A16K 7/12
[52] U.S. Cl. .................................. 137/241; 251/331; 251/144
[58] Field of Search ..................... 251/144, 331, 335.2; 137/238, 241

[56] References Cited

U.S. PATENT DOCUMENTS

| | | | |
|---|---|---|---|
| 627,561 | 6/1899 | Williams . | |
| 862,867 | 8/1907 | Eggleston | 251/61 X |
| 1,070,803 | 8/1913 | Harkom . | |
| 1,497,275 | 6/1924 | Hench . | |
| 1,771,043 | 7/1930 | Ireland . | |
| 2,986,372 | 5/1961 | Yocum | 251/214 |
| 3,160,389 | 12/1964 | Schmitz | 251/327 |
| 3,211,416 | 10/1965 | Billeter et al. | 251/54 |
| 3,310,279 | 3/1967 | Boteler | 251/331 |
| 3,310,280 | 3/1967 | Boteler | 251/331 |
| 3,424,429 | 1/1969 | Monnich | 251/129 |
| 3,429,552 | 2/1969 | Huley et al. | 251/331 X |
| 3,838,707 | 10/1974 | Wachourtz, Jr. | 251/335.2 X |
| 3,895,651 | 7/1975 | Ohada et al. | 137/238 X |
| 3,918,678 | 11/1975 | Rechtsteiner et al. | 251/144 |
| 4,013,096 | 3/1977 | De Frees | 251/144 X |
| 4,137,935 | 2/1979 | Snowdon | 251/144 X |
| 4,157,808 | 6/1979 | Eidsmore | 251/205 |
| 4,243,070 | 1/1981 | Jackson | 251/331 X |
| 4,280,680 | 7/1981 | Payne | 251/175 |
| 4,348,005 | 9/1982 | Eaton et al. | 251/268 |

Primary Examiner—A. Michael Chambers
Assistant Examiner—John C. Fox
Attorney, Agent, or Firm—Steele, Gould & Fried

[57] ABSTRACT

A valve particularly adapted for use as a sterilizable drain valve to be mounted flush in the bottom of a tank, has a housing body running flush with the bottom of the tank and a piston-mounted diaphragm sealing an opening perpendicular to the tank walls. A steam inlet and first outlet, running perpendicular to the valve axis, communicate with a valve chamber through which the piston operator and diaphragm are movable. The diaphragm can be polyetheretherketone (PEEK), which is difficult to imprint, at least on a side facing the opening in the tank. A containment outlet disposed opposite the diaphragm from the inlet permits containment of tank contents in the event of diaphragm rupture. The containment outlet is connected to the area of the diaphragm adjacent the pump chamber along an axial slot in the operator piston. A handle threadably mounted on a bonnet of the valve housing is used for axially displacing the operator pistor toward and away from the inlet.

8 Claims, 3 Drawing Sheets

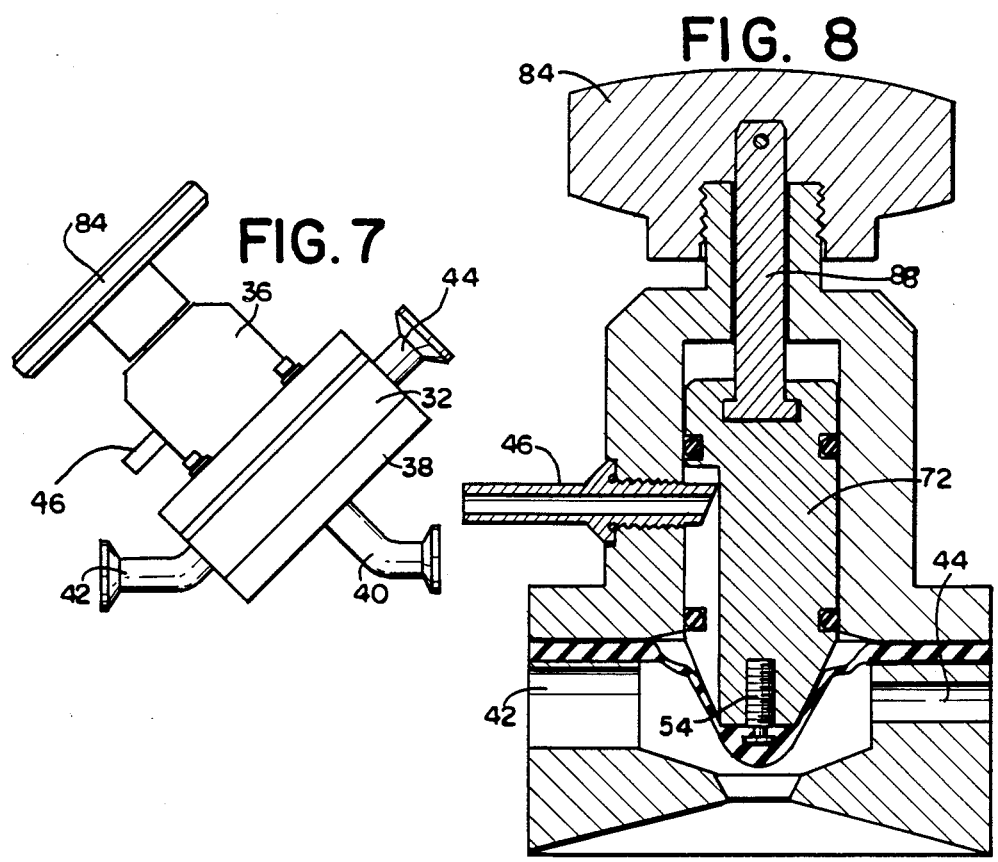
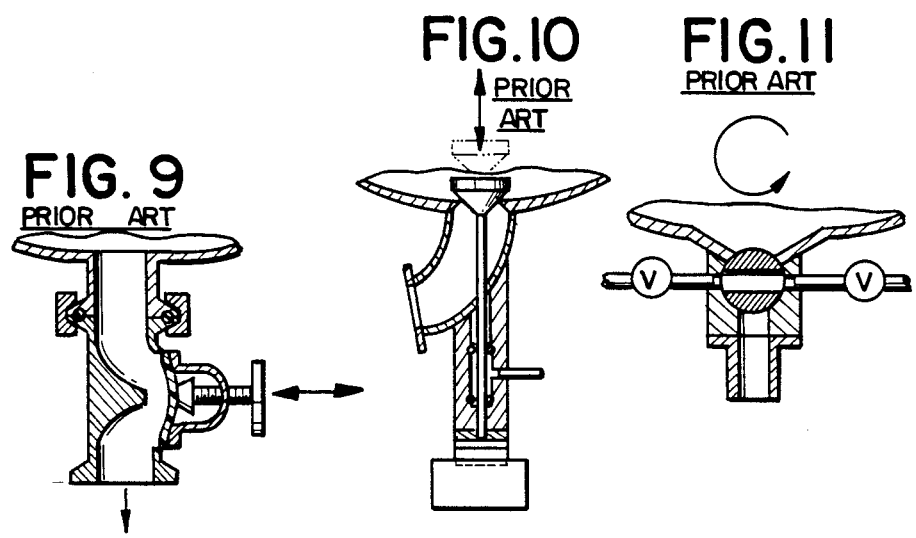

FLUSH SEALING TANK VALVE WITH DIAPHGRAM

BACKGROUND OF THE INVENTION

1. Field of the Invention

This invention relates to the field of diaphragm valves, and in particular to a high performance steam-sterilizable diaphragm valve especially adapted for sealing bottom drains in tanks used for fermentation processes, biological experimentation, manufacturing and the like.

2. Prior Art

Many typical manually-operated valves employ some form of movable valve body or plug that can be advanced or retracted along an axis to close or open a conduit between an inlet and an outlet. Typically, the inlet and outlet of the valve are arranged along a straight line such that the valve can be placed conveniently in line along the pipe. A valve plug can be made movable along an axis to seal across a straight section in such valves, but a weir or discontinuity in the flow path usually is defined between the inlet and outlet, with the movable valve plug being displaceable to cover the weir and thus seal the inlet from the outlet. An example of this valve arrangement is shown in U.S. Pat. No. 627,561—Williams.

Diaphragm valves are known in which the valve body, which is movable to close the space between the inlet and outlet, is also sealed with respect to the housing, thereby achieving protection against any leakage which may otherwise occur, particularly along the valve operator, normally a threadable shaft with a knob or other handle. A typical sealing diaphragm is shown in U.S. Pat. No. 4,280,680—Payne in connection with a similar structure to that of Williams. In each case, the valves are arranged such that aligned inlet and outlet conduits are separated by a weir element, with the passageway between the inlet and outlet being closed by a dam-like weir element defining a valve seat on an opening disposed coaxially with the axis of the valve.

A common type of diaphragm valve characterized by an uncomplicated structure against which the diaphragm is movable is shown, for example, in U.S. Pat. No. 3,310,280—Boteler. According to this type of valve, a constriction in the conduit between the inlet and outlet openings is defined by a dam with a flat surface on an inner wall partially occluding the conduit. The diaphragm, which is mounted on a movable valve plug, can be advanced against the dam using a threaded operator handle, thereby blocking the conduit completely. In U.S. Pat. No. 3,310,279—Boteler, the valve operator is carried in a bonnet. In each case, the diaphragm is a rubber sheet material with a thick central plug having an embedded threaded shaft for attachment to the movable valve plug.

The present invention relates to a particular form of diaphragm valve, especially useful as a drain valve for the bottom wall of a tank, and having the capability of sterilization of the valve without emptying the tank. In high performance applications with sealing of sensitive or toxic materials, it is important both to ensure containment of the contents of the tank or other vessel, and to assure complete cleaning, perhaps by high temperatures and pressure sterilization of the valve, even without opening it. Equipment of this type is used, for example, in fermentation processes, in manufacturing and experimentation regarding recombinant DNA, tissue cultures, manufacturing of certain food products and the like. In order to avoid inadvertent release of dangerous compositions or live organisms with unknown environmental effects, and to avoid possibly poisoning human operators of the establishment, a drain valve of this type is provided with means for in situ sterilization using a flushing fluid such as high pressure superheated steam. This is accomplished by passing the current of steam through the valve downstream of the valve inlet and on the upstream surface of the diaphragm adjacent the valve seat. Of course in a diaphragm valve, the presence of steam may deteriorate the flexible diaphragm material and cause various other difficulties as discussed hereinafter.

A number of different valve structures are used in the prior art as controllable drains for the bottoms of tanks. Some general types are shown in FIGS. 9-11. The requirements of sterilization, and further demands that are peculiar to manufacturing and experimentation using live tissue cultures, especially mammalian cells, have implications with respect to known valves. The present invention is distinct from the prior art valves as depicted in FIGS. 9, 10 and 11, assuring sterilizations, containment and flush sealing which are not available according to the prior art. In each case, known valves are characterized by the presence of catch points which are exposed to tank contents but are not subject to sterilization, so-called "dead legs" upstream of the seal at which the conduit will accumulate sediment, and a lack of full containment.

In FIG. 9, a diaphragm valve of the type disclosed in the aforesaid patents to Boteler is mounted at the bottom of a tank. This type of valve, known as a weir valve, is characterized by a length of conduit between the bottom of the tank and the closure between the diaphragm and the weir or dam of the valve. Furthermore, it is not readily possible to sterilize the valve in place according to known constructions. Removal of the valve may be necessary for sterilization. Valves of this type are in use as tank drain valves, and are available for sale from various companies including Grinell Co., Saunders Valve Co. Ltd., and Valex Corp.

Assuming one attempted to re-design a known diaphragm valve for the capability of continuous sterilization in situ (e.g., providing a steam inlet at a point upstream of the diaphragm and downstream of the weir), there are still certain problems that can cause difficulties. The variation in pressure, and possible elevated temperatures particularly during sterilization, deteriorates the flexible diaphragm material. Use can cause an imprint of the weir to develop in the diaphragm when pressed against the weir by the operator. The imprint detracts from sealing effectiveness and the valve must be cranked down more and more tightly as the diaphragm ages. To avoid premature diaphragm failure, valves of this type frequently have complex-shaped compressor elements, finger plates and the like that are employed in addition to a simple diaphragm as a means to support the diaphragm, to ensure that the diaphragm does not flex in an unintended area and to prevent leakage. With repeated opening and closing, the pressure of the diaphragm against the weir, causes a depression to develop in the diaphragm. This happens in particular when certain diaphragm materials are employed, and the depression problem is aggravated by use of materials adapted for adverse environments such as steam sterilization. Prior art valves can be provided with two piece tetrafluoroethylene (TFE) diaphragms in which a compressor (the valve body) presses against a diaphragm through an intermediate backing cushion. The diaphragm facing the weir is made of TFE. Experimentation with such valves in high performance applications has shown that a permanent imprint very quickly develops in the TFE and uless sealing pressure is progressively increased, premature failure and leakage can result.

Weir valves of this type have not been entirely suitable in connection with fermentation processes and experimentation with recombinant DNA, or with mammalian cell experimentation. These experiments, often involving biological organisms that are very sensitive to changes in oxygen, PH, temperature and pressure, may continue for prolonged periods of time. The particular culture cells used in the process may be carried on discrete carrier bodies in the solution, which is very gently mixed to avoid undue shear stress that could affect the fragile cells. The use of discrete carriers and the need to minimize agitation of the solution cause sediment to accumulate. Any dead leg, that is, any sheltered conduit section upstream of the valve seat for example between the bottom of the tank of FIG. 8 and weir of the valve, accumulates denser material such as cell carriers, and could adversely affect results.

A further prior art valve that can be used to close the bottom of the tank is shown in FIG. 10. This valve, known as a "tulip" valve, is characterized by a movable tapered plug or tulip on a thin shaft that can be lifted into the tank to clear the drain opening or withdrawn from the tank toward the drain opening to close the drain. Typically, the shaft carrying the tulip is provided with a set of O-rings for sealing the thin tulip carrying shaft from the valve operator handle. A difficulty with this type of valve is that material from the tank that contacts the tulip shaft can be drawn by retraction of the tulip shaft into a protected area adjacent the O-rings, possibly between the O-rings. If one applies steam to the area of the drain upstream of the O-rings, the area between the O-rings remains unsterilized; if steam is applied between the O-rings, containment and sealing may be compromised and it may not be possible to achieve the wetting and flow needed to achieve complete sterilization. The seat between the tulip body and the edges of the tank are characterized by a sloping configuration directed toward the drain opening. The sloping of the opening allows the tulip and its seat to engage along an area having a width. Greater pressure increases the width and sealing. However, the tulip likewise cannot be drawn entirely down into the drain hole. Therefore, the opening is not flush and may accumulate sediment at least immediately adjacent the protruding portion of the tulip. Tulip valves are available from companies including Ladish Corp. And TCI-Superior, Inc., and are known as kettle tank valves, tulip type.

A thid valve which is in use for sealing the drain openings of tanks is a ball tank valve. This valve, shown in FIG. 11, is characterized by a rotatable ball having a conduit through the ball and means to either align the conduit to define a through drain opening or to align the conduit with a steam source and steam drain or condensate sump and to seal the drain. This valve is reasonably effective but tank contents contacting the ball are carried around the ball when the ball is rotated, even though seals are normally provided between the rotatable ball and the wall of the vessel, and also between the rotatable ball and the drain opening.

According to the present invention, difficulties with contamination, sealing and sediment trapping dead legs are entirely avoided by providing a diaphragm valve with an operator that moves the diaphragm through a sterilizable valve chamber, the diaphragm sealing the valve chamber and including a plug that operates from outside the tank to advance a plug into a drain-defining opening disposed at an outer wall of the valve housing. The valve housing is preferably welded to the tank such that the housing outer wall is disposed flush with the bottom of the tank. Very little discontinuity occurs that could cause accumulation of sediment in the bottom of the tank as a result of the valve. The same conduit employed as the drain outlet of the valve is used to carry away steam condensate. On an opposite side of the diaphragm from the valve inlet, a movable valve body attached to the diaphragm at the central plug is sealed to a valve bonnet by means of O-rings, and furthermore a containment conduit is provided such that any breach of the diaphragm will result in contents escaping only through this conduit and into a containment vessel. Pressure in the containment conduit can be sensed as a means to detect diaphragm failure.

The tank-mounted portion of the valve housing tapers from the tank side to the drain, defining a scooped out upper surface with the drain at the lowest point. On an opposite side from the tank, an opposed taper defines the valve chamber. The particular structure of the valve housing of the invention places a substantial thickness of metal around the periphery of the valve housing in the area of welding to the tank. The foremost portion of the valve housing can be separated from the valve bonnet, diaphragm and the like, for easy maintenance when necessary. The valve can be assembled and tried and the integrity of the valve can be proved before the valve is installed in place, because the attachment of the valve to the tank is remote from the interaction of the diaphragm and its seat at the inlet to the valve.

The preferred diaphragm material is particularly adapted to withstand extremes of temperature and pressure characteristic of frequent of continuous sterilization, and to avoid any indentation caused by pressure and heat. Accordingly, stress on the diaphragm can be concentrated at the point of sealing, improving sealing effectiveness by maximizing the seal's pressure per unit of seal area.

The valve of the invention is particularly adapted for high performance biological production and experimentation, being optimally adapted to comport with peculiar requirements in this field including sterilization, containment and preclusion of sedimentation, while at the same time providing ease of maintenance and an inexpensive construction.

SUMMARY OF THE INVENTION

It is an object of the invention to provide a flush-mounting flush-sealing diaphragm valve for the bottom drain of tanks, characterized by the capability of complete continuous steam sterilization of the diaphragm in situ and maximum tank content containment with minimum sedimentation.

It is another object of the invention to provide a particular diaphragm construction in which a high sealing pressure can be employed without undue leakage caused by indentation of the diaphragm.

It is a further object of the invention to permit containment of a sealed valve area in the event of diaphragm rupture.

It is yet another object of the invention to provide a sterilized flush-mounted tank bottom valve that is fully dependable rather than possibly or marginally effective for the most demanding of sensitive and/or hostile environments.

These and other objects are accomplished by a valve particularly adapted for use as a sterilizable drain valve to be mounted flush in the bottom of a tank, with a housing body running flush with the bottom of the tank and a piston-mounted diaphragm sealing an opening substantially perpendicular to the tank bottom wall. A steam inlet and first outlet, running perpendicular to the valve axis, communicate with a valve chamber through which the piston operator and diaphragm are movable to open or close the valve inlet in an exterior wall of the valve housing. A containment outlet disposed opposite the diaphragm from the inlet permits containment of tank contents in the event of diaphragm rupture. The containment outlet is connected to the area of the diaphragm adjacent the pump chamber along an axially running slot in the operator piston. A handle threadably mounted on a bonnet of the valve housing is used for axially displacing the operator piston toward and away from the inlet.

BRIEF DESCRIPTION OF THE DRAWINGS

There are shown in the drawings the embodiments that are presently preferred. It shoud be understood that the invention is not limited to the precise arrangements and instrumentalities in the drawings, wherein:

FIG. 7 is an elevation view of an alternative embodiment in which the inlet is connected by means of a conduit to the valve.

FIG. 8 is a section view of an alternative embodiment.

FIGS. 9, 10 and 11 are section views illustrating prior art tank valves.

DETAILED DESCRIPTION OF THE PREFERRED EMBODIMENTS

Figure 1:
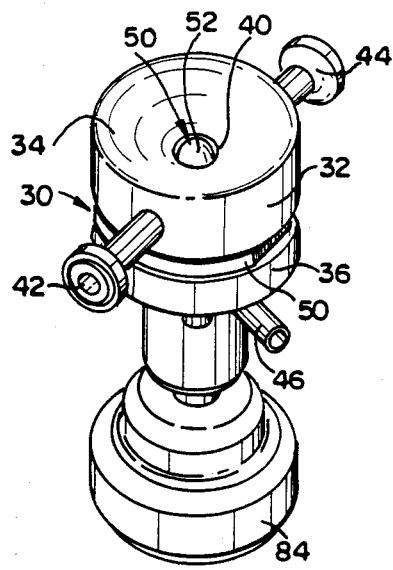
FIG. 1 is a perspective view of a valve according to the invention.

The valve of the invention is shown in FIG. 1, apart from connection to a tank. The valve includes a valve housing 30 which as shown includes an upper housing body 32 defining a valve chamber, and a lower valve bonnet 36. A diaphragm 50 is disposed between the bonnet 36 and upper housing body 32 and is movable through the valve chamber such that the plug portion 52 of diaphragm 50 can be sealably engaged in an inlet opening 40 in the upper wall 34 of the valve housing 30. The references to "upper" or "lower" parts herein do not preclude mounting the valve in other orientations, but are employed for convenience to describe the valve in a preferred orientation and mounting where inlet 40 is at the lowest point in a vessel. An inlet 44 leading to the valve is provided for steam for sterilizing the valve chamber and one surface of the diaphragm 50 within housing 30. An outlet 42 is provided, also along a side of the housing, as a main drain in the event the contents of a tank are to be drained, and/or to carry away sterilizing steam and condensation from steam coming in through steam inlet 44. A containment conduit 46 on an opposite side of diaphragm 50 can be connected to a sensor and/or to a containment vessel and will prevent the escape of leakage in the event diaphragm 50 is ruptured. A handle 84 disposed on the bottom of bonnet 36 allows the user to threadably advance and retract the plug portion 52 of diaphragm 50 to open and close the valve by turning the handle.

Figure 2:
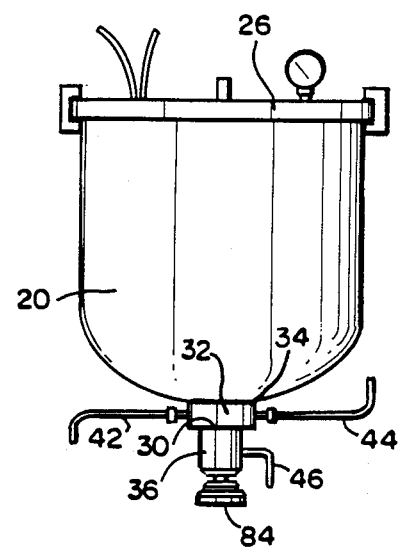
FIG. 2 is an elevation view of a tank including tha valve of the invention, as installed.
Figure 5:
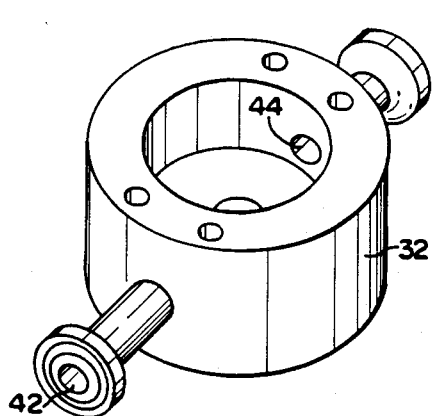
FIG. 5 is a perspective view of the valve housing body, shown upside-down with respect to the depiction in FIG. 1.

In FIG. 2, the valve is shown in elevation. A tank 20, for example a pressurized or closed environment tank sealed by a lid 26, is adapted for production or experimentation of various kinds. The tank is provided with the valve of the invention for sealing a drain in the lowermost portion thereof. Tank 20 may be a stainless steel tank, to which housing 30 of the valve of the invention is welded along the outer edge of wall 34 at the facing part of housing body 32. Steam inlet 44, drain 42 and containment outlet 46 are all connected by means of conduits affixed to the valve. The valve is opened and closed by rotating handle 84, thereby forcing a valve operator upwardly or downwardly in valve bonnet 36, causing the plug at a central part of the diaphragm separating the valve chamber from the bonnet to be advanced or withdrawn from the inlet 40 (FIG. 1) in the bottom of the tank.

Figure 3:
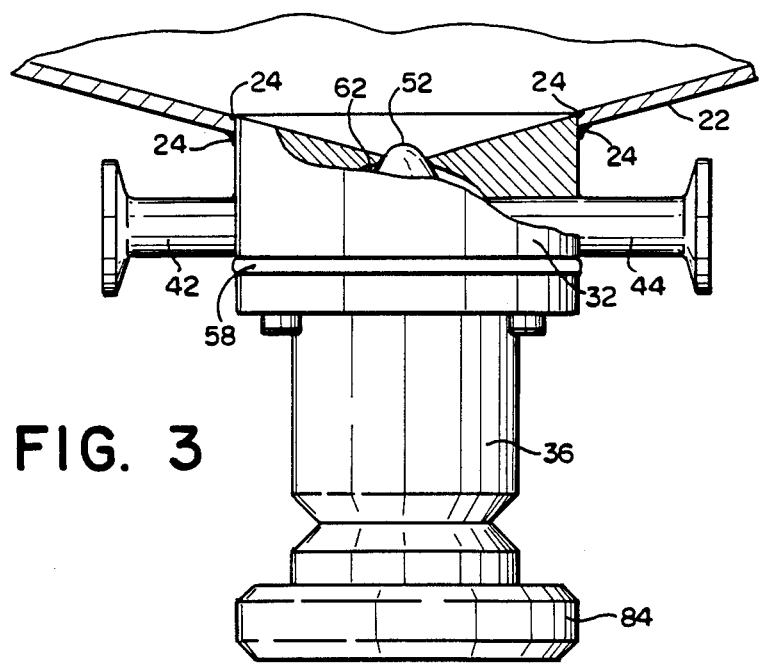
FIG. 3 is a partial cut-away view, in elevation, of the valve in place in the tank of FIG. 2.

In FIG. 3, the engagement between the valve and tank wall 22 are shown in detail, tank wall 22 being shown in section and the upper valve housing body being shown partially cutaway. Housing body 32 is welded directly into an opening in the bottom of the tank, by means of inner and outer weld beads 24 disposed around the circumference of the valve housing body 32. This welding operation can be accomplished with the valve disassembled. Even if assembled during welding, the housing 32 is large and thick enough to avoid any warping at the valve seat. The assembled valve can be proven with respect to leakage and the like prior to welding of the valve body housing 32 to tank wall 22. The integrity of the valve after the welding operation need not be proven.

The substantial quantity of metal in housing body 32 at its periphery adjacent wall 22 makes the welding more dependable because it is unlikely that any thin wall of the valve adjacent wall 22 of the tank will be cut through accidently or caused to warp due to thermal and structural stresses. Preferably, valve housing body 32 is stainless steel, for example 316L stainless steel. The valve inlet diameter can be varied as needed for a particular tank size and medium. Preferably, the outer diameter of housing 32 is about three to ten times the diameter of the inlet. In the illustrated example, the housing is about six times as wide as the inlet.

The inlet 44 for steam and the outlet 42 for general draining, are stainless steel conduits that can also be welded internally in the valve chamber 62, as well as on the surface of valve housing body 32. Preferably, Triclamp fittings or the like are provided to engage additional conduits, by means of enlarged flanges which can be engaged over O-rings by clamps. It is possible to have the steam inlet 44 and drain outlet 42 be of different internal diameters to accomodate flow as expected. Other means of interconnection of the conduits and the valve housing body, for example threadable interconnections, are also possible.

Figure 4:
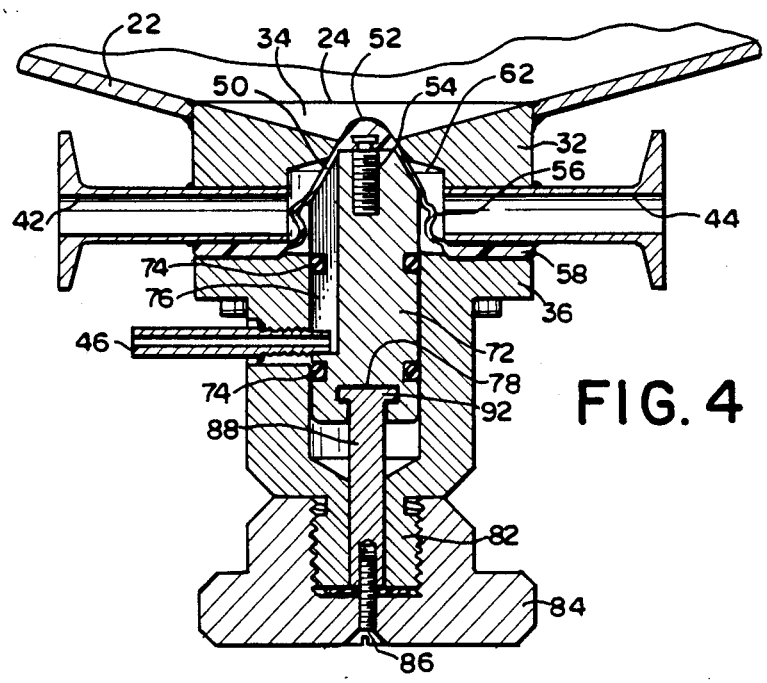
FIG. 4 is a full section view corresponding to FIG. 3.

A threadable interconnection is provided, as shown in FIG. 4, between the containment outlet 46 and the bonnet portion 36 of the valve housing. Containment conduit section 46 is threadably affixed to the bonnet, for example with an O-ring disposed between the conduit 46 and the bonnet. Conduit 46 is preferably stainless steel; however, the bonnet and possibly the handle are preferably an FDA-approved plastic. The valve handle can also be a standard cast or stamped steel handle as available in the art.

Diaphragm 50, as shown in FIG. 4, has a cupped central part and a peripheral flange portion, the flange portion being compressed between valve housing body 32 and bonnet 36. A circumferential fold or ripple 56 is formed around the priphery of the cupped part of diaphragm 50 between the flange portion 58 and the cupper part. The cupper part terminates in solid plug portion 52, which is advanced or retracted relative to a seat defined by the inlet. Preferential flexing in the area of ripple 56 decreases the likelihood of cracking in the diaphragm material due to fatigue from flexing as the plug 52 is moved up and down.

The plug portion 52 of diaphragm 50 is engaged from behind by a movable valve body 72, in the form of a piston member movable in a cylindrical bore in bonnet 36 of the valve housing. Piston 72 is sealed in the cylindrical bore in bonnet 36 by means of O-rings 74. Valve body plug 52 and piston member 72 are axially movable both toward and away from the inlet to the tank by means of operator handle 84, which is threadable on end 82 of bonnet portion 36. A connecting shaft 88 serves to axially fix piston member 72 to handle 84, while allowing relative rotation of the two. In retraction, i.e., when handle 84 is unthreaded along threaded portion 82 of bonnet 36, connecting member 88 retracts piston 72 and plug 52 by force exerted by connecting end 92 of connecting rod 88, in slot 78 of piston 72. The connecting threaded stem portion 54 of plug 52 of the diaphragm axially fixes the plug 52 to the piston 72 and in retraction of the piston pulls the diaphragm rearwardly from the seat. Accordingly, the inside of the tank (i.e., the area above wall 22 of the tank) is thereby opened to valve chamber 62, whereupon the contents will drain through outlet 42, assisted by gravity.

In the event the diaphragm 50 fails, O-rings 74 will seal against contamination outside the area of the valve, passing toward the operator handle along the space between piston 72 and the cylinder in bonnet 36 in which piston 72 is disposed to move. Furthermore, the invention preferably includes a sensing and/or containment outlet 46, connected to a containment vessel into which any escaping contents can be directed. Containment outlet 46 communicates with the area immediately adjacent diaphragm 50 by means of a slot 76. Slot 76 runs axially along the surface of piston 72 between the diaphragm and the inner opening of containment conduit 46. In the embodiment of FIG. 4, the inner end of containment conduit 46 protrudes inwardly, radially of the cylinder and into the slot 76 of piston 72, thereby guiding piston 72 and preventing relative rotation between piston 72 and bonnet 36. A pressure sensor and alarm (not shown) can be connected along the containment conduit 46 such that steam pressure applied to the containment conduit through a breached diaphragm can be sensed.

Figure 6:
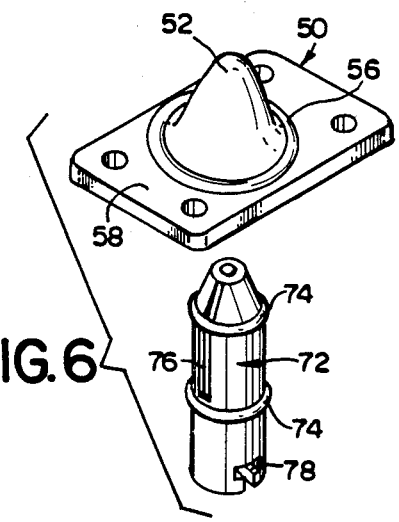
FIG. 6 is an exploded perspective view showing the valve operator including the diaphragm and movable piston element.

Piston 72 is shown in perspective FIG. 6. Slot 78, by which piston member 72 is axially attached to connecting rod 88, but rotatable with respect thereto, is a T-shaped slot running perpendicular to the axis of the valve through the lowermost portion of piston 72. The flanged end of connecting rod 88 is simply moved radially in the slot 78, thereby axially affixing the connecting rod 88 and piston 72 without preventing relative rotation. The opposite end of connecting rod 88 is fixed to the operator handle by a screw 86, oriented axially. Connecting rod 88 can be a non-round shape extending into handle 84 such that rod 88 and handle 84 rotate as a unit. In an alternative embodiment (see FIG. 8), the connecting rod 88 can be extended into and connected to the operator handle 84 by means of a transversely-oriented pin. It is also possible to employ a set screw in the handle, and a non-round configuration for connecting rod 88, to attach handle 84. In any event, the handle 84 connecting rod 88 and piston 72 are attached such that rotation of the handle will cause the piston to advance or retract.

An alternative embodiment of the invention is shown in FIG. 7. In FIG. 7, the valve is mounted along a conduit rather than in a tank bottom wall. The inlet to the valve is defined by a conduit that at its distal end is oriented substantially parallel to a distal end of the outlet conduit, such that the valve can be placed in line in a straight conduit, by means of Tri-clamps or the like. A Tri-clamp is also provided for the steam inlet, which as shown in FIG. 7 is aligned radially, opposite the outlet 42. The inlet 40 can be connected to the valve body 32 by internal welds around inlet tube 40. In other respects, the in-line version is similar to the previous embodiments, being operable by axial displacement of the valve plug at the end of a diaphragm, toward and away from a valve opening defining the inlet to the valve. This valve embodiment also includes the containment tube 46 for leak detection.

In FIG. 8, a further alternative embodiment is shown, in which the valve plug is affixed to the piston operator by means of a screw embedded in the plug. FIG. 8 also illustrates the preferred topography of the valve seat, namely defining a tapering valve seat for accommodation against the valve plug. According to many prior art constructions, in which a weir valve diaphragm is, for example, polytetrafluoroethylene (PTFE) or the like, it has been necessary to support the diaphragm from the rear by means of a relatively stiffer finger plate or other contact pad. This was in part intended to minimize development of a depression in PTFE from the localized force of the weir dam. No particular finger plate other than piston 72 behind the diaphragm is required according to the invention. PTFE is not the preferable diaphragm material, because although this material is relatively inert, it will develop a permanent indentation with pressure from the valve seat, particularly if sealed at high pressure and temperature over a long time.

According to the invention, the valve diaphragm material is made of polyetheretherketone (PEEK). This material is available under the trade name Arlo 1000, supplied by ICI Advanced Materials, Division of ICI Americas, Inc., Wilmington, DE. PEEK material is particularly adapted for severe service in steam-sealing environments. The material will not hydrolize and being a non-elastomeric thermoplastic sealing material will survive extreme differential pressures at extreme temperatures, without damage or indentation of the plug end.

As also shown in FIG. 8, the connecting rod 88 and operator handle 84 can be connected by means of a transverse pin. The embodiment of FIG. 8 likewise differs from previous embodiment in that external conduits are not provided for the steam inlet 44 and drain outlet 42. A shouldered pipe forms the containment conduit 46, which as above is attached by means of threading and is provided with an O-ring seal.

The valve of the invention is particularly adapted for pharmaceutical and fermentation applications requiring sterile operation and sanitary performance in processing. In this environment, it is quite important to be able to properly clean and sterilize all surfaces in contact with the media or fermentation broth. This is preferably done with high pressure steam application to the subject surfaces (although chemical sterilization is also feasible), and a flow of steam over the surfaces is needed to properly sterilize the components and surfaces in contact with the media and/or broth. Long term stability and reliability, and maintenance of sterile conditions over a long period of time are necessary, even in view of adverse operating conditions at the valve. Inasmuch as long term processing times are typical in this field, a failure at any point in processing can cause the entire fermentation broth or other media to be wasted. Therefore, careful planning and careful execution of operating procedures are crucial.

Historically, the fermentation industry has been able to perform many of its tasks due to the durable nature of the bacteria employed and cells being cultivated, and due to the evolutionary stability thereof. Additionally, traditional fermentation processes were often completed within 72 hours or less, and variations were acceptable within such limits. In recent times, however, many fermentations are being developed around mutated versions of common bacteria. These mutations are accomplished, for example by means of recombinant DNA, to cause them to function as miniature chemical plants. The cells are genetically arranged, for example to produce enzymes or hormones for various uses, or to produce them more efficiently. Unfortunately, the cells become quite sensitive to environmental conditions and are easily disturbed by contamination, changed in temperature, PH and oxygen saturation. Tissue cultures have been developed based upon cultivation of mammalian cells for similar purposes. These systems are also quite sensitive to environment. However, the additional complication of these cultures results from the very lengthy doubling time of the cells. Full growth of a culture may require one to six months of processing. Maintaining sterility for this extreme long period of time under conditions requiring careful treatment is quite demanding. Therefore, high performance capabilities and containment requirements become crucial because batches cannot be discarded without substantial loss.

The present valve has a number of attributes rendering it particularly adapted for these applications. The valve is characterized by a flush mounting of the valve closure at the very bottom of a tank, and has no "dead leg" or cavity where fluids could become stagnant. Sealing is accomplished at the very edge of the tank wall. The design drains fully, and is fully sterilizable at all points behind the engaged sealing surfaces. Continuous sterilization is possible, even while the inlet port is closed. No cast components are required, each part being machined from FDA-approved materials, eliminating problems with porosity. Biological hazards can be fully contained.

Sealing integrity is assured because the facing seal surfaces are very small relative to the open port area. A circular sealing surface is quite reliable and with conical disposition of facing surfaces as shown herein provides a self-alignment capability of the compressor piston 72, diaphragm 50, and especially plug 52 thereof. By trapping the sealing diaphragm between a relatively narrow edge of the facing surfaces, sealing force is applied over a diminished area, providing a greater relative sealing force per unit area and a greater effective seal pressure. Diaphragm reliability and durability are attained by use of a durable non-imprinting material and by minimizing elongation of the diaphragm by means of the annular convolutions or ripples 56. The seal occurs at a point which directly follows the contour of the vessel, and the valve body upper wall itself incorporates the contour of the vessel in the form of a dished head to facilitate full drainage and minimum discontinuity causing sedimentation. By virtue of the design of the invention, the mass of the valve body is concentrated at the outside perimeter of the valve housing instead of at the center, thereby preventing the occurrence of warpage in the sealing surfaces as frequently occurs with ball-type valves. The surfaces are also polished to a 10-20 micron finish to prevent field failures.

Although the preferred diaphragm material is high temperature non-leaching plastic polyetheretherketone (Arlon 1000 PEEK), other materials may be employed depending on the intended use of the valve. With the preferred material, the valve operation is dependable at up to 500° F. and a steam pressure of 100 PSIG. This improves substantially over previous sanitary valves, which operate at roughly 300° F. and 15 PSIG steam pressure. Quicker and more reliable sterilization is possible at the increased temperatures and pressures according to the invention, which operates at full autoclave standards.

Since the valve operator piston fits closely in the cylinder in the bonnet, and furthermore since the diaphragm plug portion is engaged in the foremost end of the piston operator, alignment of the sealing plug to the inlet opening are assured. The O-rings sealing the piston operator to the bonnet cylinder assist in sealing and improve the smoothness of operation.

Containment opening 46 has been described with reference to containment of leaks, this outlet leading to a sealing vessel. It is furthermore possible to connect the tube to a pressure-detecting switch, for operating an alarm in the event rupture of a diaphragm causes steam pressure to be detectable at outlet 46. The containment conduit 46, which tends to guide the piston, further prevents warpage and deterioration of the diaphragm.

All the materials of the valve are FDA-approved, inert and/or compatible materials. As noted hereinabove, the valve housing body is preferably a high grade stainless steel to be welded directly to the tank. The bonnet material is preferably a polyethersulphone plastic. Although a variety of diaphragm materials are possible, the aforesaid PEEK material is particularly useful and due to its strength and durability can be made quite thin, for example 0.040-0.060 inch, with corresponding increase in flexibility. As so arranged, the device is very durable and effective.

The invention having been disclosed, a number of variations will now become apparent to persons skilled in the art. Reference should be made to the appended claims rather than the foregoing specification as indicating the true scope of the subject invention.

The invention is capable of embodiment for various applications, with variations as will now be apparent to persons skilled in the art. The preferably-plastic bonnet can be replaced with a metallic arrangement for especially heavy duty applications. The closures for the drain openings, preferably varying from 0.5 to 4.0 inch, can be increased and decreased where appropriate. While the invention is believed particularly applicable to biological production and experimentation with steam sterilization, other forms of hazardous substances, such as radioactive coolants and the like can likewise be sealed and chemical or other means for flushing the valve chamber area will also be appropriate using the self-cleaning and containment features disclosed herein.

I claim:

1. A valve, comprising:
   a valve housing having an outer wall defining the first inlet to the valve, the first inlet having an inlet axis, the housing having an inner chamber and a first outlet, the first inlet and the first outlet communicating with the inner chamber;
   a valve body movably mounted in the housing, the valve body being movable along the axis of the first inlet at least partly through the inner chamber, toward and away from the first inlet;
   a diaphragm sealing across the valve chamber between the valve body and the first inlet, the diaphragm being movable by movement of the valve body along the axis of the first inlet, to seal the first inlet, and retractable to permit connection of the first inlet and the first outlet;
   means defining a second inlet to the inner chamber, the second inlet being disposed on a side of the diaphragm facing the first inlet, and means defining a second outlet located on an opposite side of the diaphragm from the first inlet, the second outlet defining a path for a sterilizing fluid;
   a shaft movable in a cylinder and connected to the valve body for advancing and retracting the valve body along the axis of the first inlet, the valve body defining an opening running parallel to the inlet axis and the valve body having a slot directed axially along an outer surface thereof, the second outlet being defined by a conduit extending radially of the axis into the slot.

2. The valve of claim 1, wherein the valve body is axially movable toward and away from the first inlet by means of a rotary operator threadably connected to the valve housing and rotatable relative to the valve body.

3. The tank valve of claim 1, wherein the housing includes a housing body and a bonnet, the housing having an outer wall proceeding from an outer edge to the first inlet, the outer wall being disposed flush with a wall of a tank, and the first inlet to the valve having a perimeter at said outer wall, the diaphragm being movable against said perimeter to thereby define a seal flush with the wall of the tank.

4. The tank valve of claim 3, wherein the outer wall of the housing body slopes toward the first inlet.

5. The tank valve of claim 1, further comprising a pair of O-rings sealing the valve body to the housing on opposite sides of the second outlet.

6. The tank valve of claim 1, further comprising a handle threadably mounted on the housing coaxially with the first inlet, the handle being connected to the valve body and rotatable relative thereto, whereby rotation of the handle advances and retracts the valve body.

7. The valve of claim 1, wherein the diaphragm comprises polyetheretherketone at least on a surface thereof directed toward the first inlet.

8. An aseptic diaphragm valve, comprising:
   a cylindrical housing having a housing body defining a valve chamber and a valve bonnet attached to the housing body, the housing defining an axis, the housing body having an inlet along the axis, communicating with the valve chamber;
   a steam inlet and a drain outlet disposed substantially perpendicular to the axis, the steam inlet and the drain outlet each running through the housing body to the valve chamber;
   an operator piston and means for advancing and retracting the operator piston, the operator being movable along the axis in the housing body and axially connected to a diaphragm sealing continuously between the housing body and the bonnet, the operator piston being operable to force a central portion of the diaphragm through the first inlet and thereby to seal the valve chamber from the inlet, the operator piston having a conduit running axially rearwards from a point adjacent the diaphragm, the bonnet having a containment conduit opening adjacent an outlet of the conduit in the operator piston;
   a plurality of O-rings sealing the operator piston to the bonnet on opposite sides of said containment conduit; and,
   the conduit in the operator pistons being an axial slot on a surface of the operator piston, the containment conduit being defined by a pipe extending radially through the bonnet into said axial slot.

* * * * *